(12) United States Patent
Lu

(10) Patent No.: US 12,475,201 B2
(45) Date of Patent: Nov. 18, 2025

(54) AUTOMATIC SCREEN UNLOCKING METHOD AND DEVICE, ELECTRONIC EQUIPMENT AND READABLE STORAGE MEDIUM

(71) Applicant: FEITIAN TECHNOLOGIES CO., LTD., Beijing (CN)

(72) Inventor: Zhou Lu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 18/561,366

(22) PCT Filed: Oct. 31, 2022

(86) PCT No.: PCT/CN2022/128598
§ 371 (c)(1),
(2) Date: Nov. 16, 2023

(87) PCT Pub. No.: WO2023/124499
PCT Pub. Date: Jul. 6, 2023

(65) Prior Publication Data
US 2024/0232305 A1    Jul. 11, 2024

(30) Foreign Application Priority Data
Dec. 27, 2021  (CN) .......................... 202111607276.2

(51) Int. Cl.
*G06F 21/31*    (2013.01)
(52) U.S. Cl.
CPC .................................. *G06F 21/31* (2013.01)

(58) Field of Classification Search
CPC .......... G06F 21/31; G06F 21/35; H04W 4/80; H04W 12/06; H04L 9/3226; H04L 9/3247
See application file for complete search history.

(56) References Cited

U.S. PATENT DOCUMENTS

| 6,747,970 B1 * | 6/2004 | Lamb | H04L 65/1069 370/352 |
| 8,060,612 B1 * | 11/2011 | Mangal | H04L 65/1073 455/433 |

(Continued)

*Primary Examiner* — Aravind K Moorthy
(74) *Attorney, Agent, or Firm* — J. Clinton Wimbish; Maynard Nexsen PC

(57) ABSTRACT

Method for automatically unlocking a screen, which comprises: sending a broadcast carrying a uuid value, when a terminal equipment determines that an equipment to which the broadcast belongs is a connectable equipment according to a signal strength of the broadcast and the uuid value, receiving a Bluetooth connection establishment request sent by the terminal equipment, establishing a Bluetooth connection with the terminal equipment based on the Bluetooth connection establishment request, acquiring to-be-signed data carried in an authentication login instruction, signing the to-be-signed data according to a stored private key to obtain a signature result, and sending the signature result to the terminal equipment, so that the terminal equipment executes an automatic screen unlocking operation according to the signature result. Accordingly, a locked screen can be quickly and automatically unlocked through an automatic unlocking processing based on the Bluetooth connection, so that the method has a relatively high safety.

4 Claims, 3 Drawing Sheets

(56) References Cited

U.S. PATENT DOCUMENTS

| | | | | |
|---|---|---|---|---|
| 8,595,810 | B1* | 11/2013 | Ben Ayed | H04L 63/0815 |
| | | | | 713/168 |
| 9,374,672 | B1* | 6/2016 | Chao | H04W 4/029 |
| 9,432,808 | B1* | 8/2016 | Reyes | G06Q 50/205 |
| 9,483,887 | B1* | 11/2016 | Soleimani | G07C 9/00309 |
| 9,877,266 | B1* | 1/2018 | Knas | H04W 4/029 |
| 9,894,477 | B1* | 2/2018 | Low | H04W 4/021 |
| 9,961,523 | B1* | 5/2018 | Daoura | H04W 4/185 |
| 10,009,868 | B1* | 6/2018 | Reyes | G06Q 30/0261 |
| 10,171,935 | B1* | 1/2019 | Reyes | G16H 40/63 |
| 10,182,463 | B1* | 1/2019 | Amithrigala | H04W 12/06 |
| 10,255,623 | B2* | 4/2019 | Chatterton | H04W 4/80 |
| 10,264,436 | B1* | 4/2019 | Wohler | H04W 8/26 |
| 10,275,575 | B1* | 4/2019 | Knas | G16H 20/60 |
| 10,560,149 | B1* | 2/2020 | Skeoch | H04B 3/54 |
| 10,636,069 | B1* | 4/2020 | Knas | H04W 4/02 |
| 10,762,183 | B1* | 9/2020 | Charan | G06F 21/40 |
| 11,032,335 | B1* | 6/2021 | Knas | H04L 65/403 |
| 11,043,086 | B1* | 6/2021 | Daoura | G08B 21/24 |
| 11,227,042 | B2* | 1/2022 | Wu | H04W 12/069 |
| 11,416,941 | B1* | 8/2022 | Allen | G06Q 10/20 |
| 11,671,829 | B1* | 6/2023 | Radhakrishnan | H04L 63/0823 |
| | | | | 713/156 |
| 11,715,563 | B1* | 8/2023 | Fox | G16H 50/30 |
| | | | | 705/2 |
| 11,930,118 | B2* | 3/2024 | Lu | G06F 21/32 |
| 12,127,079 | B2* | 10/2024 | Choi | H04L 67/02 |
| 2007/0019670 | A1* | 1/2007 | Falardeau | H04W 48/18 |
| | | | | 370/465 |
| 2008/0025278 | A1* | 1/2008 | Hoecker | H04W 24/00 |
| | | | | 370/338 |
| 2009/0264070 | A1* | 10/2009 | Lim | G06Q 30/0267 |
| | | | | 455/41.2 |
| 2012/0084734 | A1* | 4/2012 | Wilairat | G06F 21/629 |
| | | | | 345/173 |
| 2013/0019292 | A1* | 1/2013 | Varshavsky | H04L 9/3247 |
| | | | | 726/19 |
| 2013/0079037 | A1* | 3/2013 | Dobyns | H04W 4/029 |
| | | | | 455/456.3 |
| 2013/0094544 | A1* | 4/2013 | Moshfeghi | H04W 72/0453 |
| | | | | 375/299 |
| 2013/0290234 | A1* | 10/2013 | Harris | G06Q 30/00 |
| | | | | 901/50 |
| 2014/0033321 | A1* | 1/2014 | Patidar | G06F 21/6218 |
| | | | | 726/27 |
| 2014/0155031 | A1 | 6/2014 | Lee et al. | |
| 2015/0031348 | A1* | 1/2015 | Lee | G06F 3/0482 |
| | | | | 455/418 |
| 2015/0070301 | A1* | 3/2015 | Chia | G06V 40/1365 |
| | | | | 345/174 |
| 2015/0082404 | A1* | 3/2015 | Goldstein | H04W 4/023 |
| | | | | 726/7 |
| 2015/0099469 | A1* | 4/2015 | Goldstein | H04W 4/80 |
| | | | | 455/41.2 |
| 2015/0156309 | A1* | 6/2015 | Gruberman | H04W 4/02 |
| | | | | 455/414.3 |
| 2015/0289207 | A1* | 10/2015 | Kubo | H04W 4/029 |
| | | | | 370/311 |
| 2015/0312696 | A1* | 10/2015 | Ribbich | H04W 4/029 |
| | | | | 455/418 |
| 2015/0334548 | A1* | 11/2015 | Liu | H04W 4/021 |
| | | | | 370/329 |
| 2015/0340909 | A1* | 11/2015 | Bell | H02J 50/80 |
| | | | | 307/104 |
| 2016/0055693 | A1* | 2/2016 | Somani | G07C 9/28 |
| | | | | 340/5.61 |
| 2016/0055770 | A1* | 2/2016 | Li | G09C 5/00 |
| | | | | 380/287 |
| 2016/0081009 | A1* | 3/2016 | Tailor | H04W 48/16 |
| | | | | 455/432.1 |
| 2016/0094598 | A1* | 3/2016 | Gedikian | H04L 65/611 |
| | | | | 455/456.3 |
| 2016/0100275 | A1* | 4/2016 | Viswanadham | H04W 4/21 |
| | | | | 455/41.2 |
| 2016/0100311 | A1* | 4/2016 | Kumar | H04W 12/06 |
| | | | | 726/7 |
| 2016/0104154 | A1* | 4/2016 | Milov | G06Q 20/401 |
| | | | | 705/67 |
| 2016/0127875 | A1* | 5/2016 | Zampini, II | G01S 5/0226 |
| | | | | 370/311 |
| 2016/0173578 | A1* | 6/2016 | Sharma | H04W 12/06 |
| | | | | 709/203 |
| 2016/0182170 | A1* | 6/2016 | Daoura | H04W 12/033 |
| | | | | 455/3.01 |
| 2016/0189514 | A1* | 6/2016 | Todasco | G08B 25/08 |
| | | | | 340/8.1 |
| 2016/0234641 | A1* | 8/2016 | Todasco | H04L 61/4594 |
| 2016/0278137 | A1* | 9/2016 | Oguchi | H04W 4/80 |
| 2016/0286386 | A1* | 9/2016 | Farrell | H04W 4/029 |
| 2016/0292635 | A1* | 10/2016 | Todasco | H04W 4/023 |
| 2016/0300285 | A1* | 10/2016 | Gandhi | G06K 19/0717 |
| 2016/0316503 | A1* | 10/2016 | Raphael | H04W 4/80 |
| 2016/0381504 | A1* | 12/2016 | Sommer | G01S 13/765 |
| | | | | 455/456.1 |
| 2016/0381510 | A1* | 12/2016 | Reynolds | H04W 4/026 |
| | | | | 455/456.1 |
| 2017/0013590 | A1* | 1/2017 | Noorshams | H04W 64/00 |
| 2017/0055112 | A1* | 2/2017 | Westphal | H04W 4/02 |
| 2017/0055113 | A1* | 2/2017 | Kusens | G01S 1/042 |
| 2017/0094477 | A1* | 3/2017 | Kusens | H04W 4/029 |
| 2017/0126504 | A1* | 5/2017 | Fang | H04L 47/783 |
| 2017/0164321 | A1* | 6/2017 | Qiu | H04W 64/006 |
| 2017/0171705 | A1* | 6/2017 | Bordash | H04W 4/021 |
| 2017/0187425 | A1* | 6/2017 | Kuscher | H04W 8/005 |
| 2017/0269963 | A1* | 9/2017 | Quinlan | G06F 9/485 |
| 2017/0280298 | A1* | 9/2017 | Mycek | H04W 4/023 |
| 2017/0300678 | A1* | 10/2017 | Metke | H04W 12/068 |
| 2017/0374515 | A1* | 12/2017 | Cox | G08B 21/0227 |
| 2018/0113654 | A1* | 4/2018 | Yeung | H04W 4/80 |
| 2018/0115454 | A1* | 4/2018 | Kodimer | H04W 4/70 |
| 2018/0167452 | A1* | 6/2018 | Yucelen | H04W 4/46 |
| 2018/0191169 | A1* | 7/2018 | Biddle | H02J 7/00047 |
| 2018/0220181 | A1* | 8/2018 | Ogle | H04N 21/4516 |
| 2018/0249312 | A1* | 8/2018 | Roh | H04W 4/80 |
| 2018/0255426 | A1* | 9/2018 | Liao | H04W 4/021 |
| 2018/0367942 | A1* | 12/2018 | Bloechl | H04W 76/00 |
| 2018/0370758 | A1* | 12/2018 | Huang | B66B 1/2408 |
| 2019/0007548 | A1* | 1/2019 | Sit | H04W 4/80 |
| 2019/0019177 | A1* | 1/2019 | Lee | G06F 21/74 |
| 2019/0132815 | A1* | 5/2019 | Zampini, II | G06Q 50/06 |
| 2019/0140908 | A1* | 5/2019 | Ma | H04L 43/10 |
| 2019/0148991 | A1* | 5/2019 | Lin | G01S 5/0081 |
| | | | | 307/104 |
| 2019/0149768 | A1* | 5/2019 | Mcardle | H04N 7/147 |
| | | | | 348/14.09 |
| 2019/0180540 | A1* | 6/2019 | Usi | G07C 9/20 |
| 2019/0182627 | A1* | 6/2019 | Thoresen | H04L 63/045 |
| 2019/0187970 | A1* | 6/2019 | Zhuang | G06F 12/14 |
| 2019/0238515 | A1* | 8/2019 | Dodd | H04L 63/0407 |
| 2019/0246257 | A1* | 8/2019 | Hasegawa | H04W 4/80 |
| 2019/0305567 | A1* | 10/2019 | Keeley | H02J 50/40 |
| 2019/0318611 | A1* | 10/2019 | Gravel | H04W 4/029 |
| 2019/0349252 | A1* | 11/2019 | Hu | H04L 41/0895 |
| 2019/0359129 | A1* | 11/2019 | Elliott | B60R 22/48 |
| 2019/0363904 | A1* | 11/2019 | Drake | H04L 63/0442 |
| 2020/0005557 | A1* | 1/2020 | Madaan | G06Q 50/40 |
| 2020/0128482 | A1* | 4/2020 | Daoura | H04W 4/80 |
| 2020/0311700 | A1* | 10/2020 | Hwang | G06Q 20/322 |
| 2020/0349781 | A1* | 11/2020 | Warrier | G07C 9/00309 |
| 2021/0076163 | A1* | 3/2021 | Burowski | H04W 4/08 |
| 2021/0105133 | A1* | 4/2021 | Wang | H04L 9/0637 |
| 2021/0136720 | A1* | 5/2021 | Geraghty | H04W 4/021 |
| 2021/0243595 | A1* | 8/2021 | Buck | G06F 21/604 |
| 2021/0337355 | A1* | 10/2021 | Sobol | H04W 4/023 |
| 2021/0352242 | A1* | 11/2021 | Mcardle | H04L 65/1083 |
| 2021/0358269 | A1* | 11/2021 | Schwartz | H04W 4/21 |
| 2021/0358280 | A1* | 11/2021 | Dorrell | G08B 13/2448 |
| 2022/0066010 | A1* | 3/2022 | Henry | G01S 5/0236 |
| 2022/0070612 | A1* | 3/2022 | Henry | H04B 1/7163 |
| 2022/0095003 | A1* | 3/2022 | Ogle | H04N 21/43632 |

(56) References Cited

U.S. PATENT DOCUMENTS

| | | | |
|---|---|---|---|
| 2022/0197986 A1* | 6/2022 | Zizi | H04L 63/0861 |
| 2022/0217517 A1* | 7/2022 | Daoura | H04W 4/80 |
| 2023/0403556 A1* | 12/2023 | Wiese | H04W 4/80 |
| 2023/0419428 A1* | 12/2023 | Harr | G06Q 50/16 |
| 2024/0134353 A1* | 4/2024 | Zhu | G06F 3/0412 |
| 2025/0074358 A1* | 3/2025 | Kasai | H04W 84/20 |

* cited by examiner

AUTOMATIC SCREEN UNLOCKING METHOD AND DEVICE, ELECTRONIC EQUIPMENT AND READABLE STORAGE MEDIUM

TECHNICAL FIELD

The present invention relates to a method for auto-unlocking screen, an apparatus, an electronic device and a readable storage medium thereof, which belongs to information security field.

BACKGROUND ART

In prior art, by setting screen locking of a terminal device, a user can lock the screen of the terminal device when the user leaves the terminal device in order to prevent information in the terminal device from leaking and protect safety of the information in the terminal device; the way for unlocking the screen of the terminal device is implemented by that a user inputs a set password to a real keyboard. That way of unlocking the screen requires the user to actively touch the real keyboard so as to trigger input operation of verification of unlocking; that operation is not convenient and position of the press keys on the keyboard is fixed, which is easily causing leaking of the password and security of unlocking way is low; therefore, how to auto-unlock a locked screen of the terminal device safely, effectively and quickly becomes an urgent technical problem.

SUMMARY OF THE INVENTION

The object of the present invention is to provide a method for auto-unlocking screen, an apparatus, an electronic device and a readable storage medium thereof, which can realize unlocking a locked screen of the terminal safely, effectively and quickly.

Thus, according a first aspect of the present invention, there is provided a method for auto-unlocking screen, which includes the following steps:

sending a broadcast carrying a uuid value;
when a terminal device determines that a device, to which the broadcast belongs, is a connectable device according to signal strength and the uuid value, receiving a Bluetooth connection building request sent from the terminal device;
building Bluetooth connection with the terminal device based on the Bluetooth connection building request;
sending a notification message that Bluetooth connection is built successfully to the terminal device;
receiving an authenticating logging on instruction sent from the terminal device based on the notification message;
acquiring data to be signed in the authenticating logging on instruction;
signing the data to be signed according to a stored private key to obtain a signing result, and
sending the signing result to the terminal device so as to make the terminal device perform operation of auto-unlocking screen according to the signing result.

Preferably, after receiving an authenticating logging on instruction sent from the terminal device based on the notification message, the method further includes:
acquiring an instruction eigenvalue carried in the authenticating logging on instruction;
determining whether requires performing process of confirming by pressing key according to the instruction eigenvalue;
when processing of confirming by pressing key is determined to be required, sending an instruction information for executing press key confirming to a user and wait for receiving confirming trigger of pressing key made by a user; and
when processing of confirming by pressing key is determined not to be required, performing signing operation on the data to be signed according to a stored private key.

Preferably, waiting for receiving confirming trigger of pressing key made by a user includes:
when receiving confirming trigger of pressing key made by a user, performing process of signing the data to be signed according to a stored private key;
when not receiving confirming trigger of pressing key made by a user, determining whether the time for waiting for receiving confirming trigger of pressing key made by a user reaches a preset time threshold value; and
if the preset time threshold value is not reached, determining that trigger of pressing key made by the user is not overtime, keep on waiting for receiving confirming trigger of pressing key made by the user.

Preferably, n the method further includes:
if the preset time threshold value is reached, determining that trigger of pressing key made by the user is overtime, send a result that triggering is overtime to the terminal device.

Preferably, the method further includes:
receiving information acquiring instruction sent from the terminal device; and
sending corresponding press key information according to the information acquiring instruction back to the terminal device.

According to a second aspect of the present invention, there is provided an apparatus for auto-unlocking screen, which includes:
a sending module configured to send broadcast carrying a uuid value;
a receiving module configured to, when a terminal device determines that a device, to which the broadcast belongs, is a connectable device according to signal strength and the uuid value, receive a Bluetooth connection building request sent from the terminal device;
a first processing module configured to build Bluetooth connection with the terminal device based on the Bluetooth connection building request;
a second processing module configured to send a notification message that Bluetooth connection is built successfully to the terminal device; receive an authenticating logging on instruction sent from the terminal device based on the notification message;
a third processing module configured to acquire data to be signed in the authenticating logging on instruction;
a fourth processing module is configured to sign the data to be signed according to a stored private key to obtain a signing result; and
the sending module is further configured to send the signing result to the terminal device so as to make the terminal perform operation of auto-unlocking screen according to the signing result.

Preferably, the apparatus further includes:
a fifth processing module configured to acquire an instruction eigenvalue carried in the authenticating logging on instruction; to determine whether requires performing process of confirming by pressing key according to the instruction eigenvalue;

when performing process of confirming by pressing key is determined to be required, to send an instruction information for executing press key confirming to a user and waiting for receiving confirming trigger of pressing key made by a user; and when performing process of confirming by pressing key is determined not to be required, to perform signing operation on the data to be signed according to a stored private key.

Preferably, the fifth processing module is configured to, when receiving confirming trigger of pressing key made by a user, perform process of signing the data to be signed according to a stored private key; when not receiving confirming trigger of pressing key made by a user, to determine whether the time for waiting for receiving confirming trigger of pressing key made by a user reaches a preset time threshold value; and if the preset time threshold value is not reached, to determine that trigger of pressing key made by the user is not overtime, to keep on waiting for receiving confirming trigger of pressing key made by the user.

Preferably, the fifth processing module is configured to if the preset time threshold value is reached, determine that trigger of pressing key made by the user is overtime, send a result that triggering is overtime to the terminal device.

Preferably, the apparatus further includes:

a sixth processing module configured to receive information acquiring instruction sent from the terminal device; and send corresponding press key information according to the information acquiring instruction back to the terminal device.

According to a third aspect of the present invention, there is provided an electronic device, which includes: a processor and a storage;

the storage is configured to store computer program; and
the processor is configured to perform the method for auto-unlocking screen by invoking the computer program.

According to a fourth aspect of the present invention, there is provided a computer readable storage medium, which is configured to store computer program, when the computer program runs on a computer to make the computer, to perform the method for auto-unlocking screen.

Based on the auto-unlocking process with the Bluetooth connection, the present invention realizes auto-unlocking the locked screen of the terminal device safely, effectively and quickly.

BRIEF DESCRIPTION OF THE DRAWINGS

By reading detailed description of preferred embodiments in the following text, all kinds of other advantages and benefits become more clearer for those skilled in the art. The accompanying drawings is for presenting the preferred embodiments only, which is not to be regarded as limitation of the preset embodiment. In all accompanying drawings, same reference symbols represent a same component. In the accompanying drawings.

DESCRIPTION OF THE PREFERRED EMBODIMENTS

Figure 1:
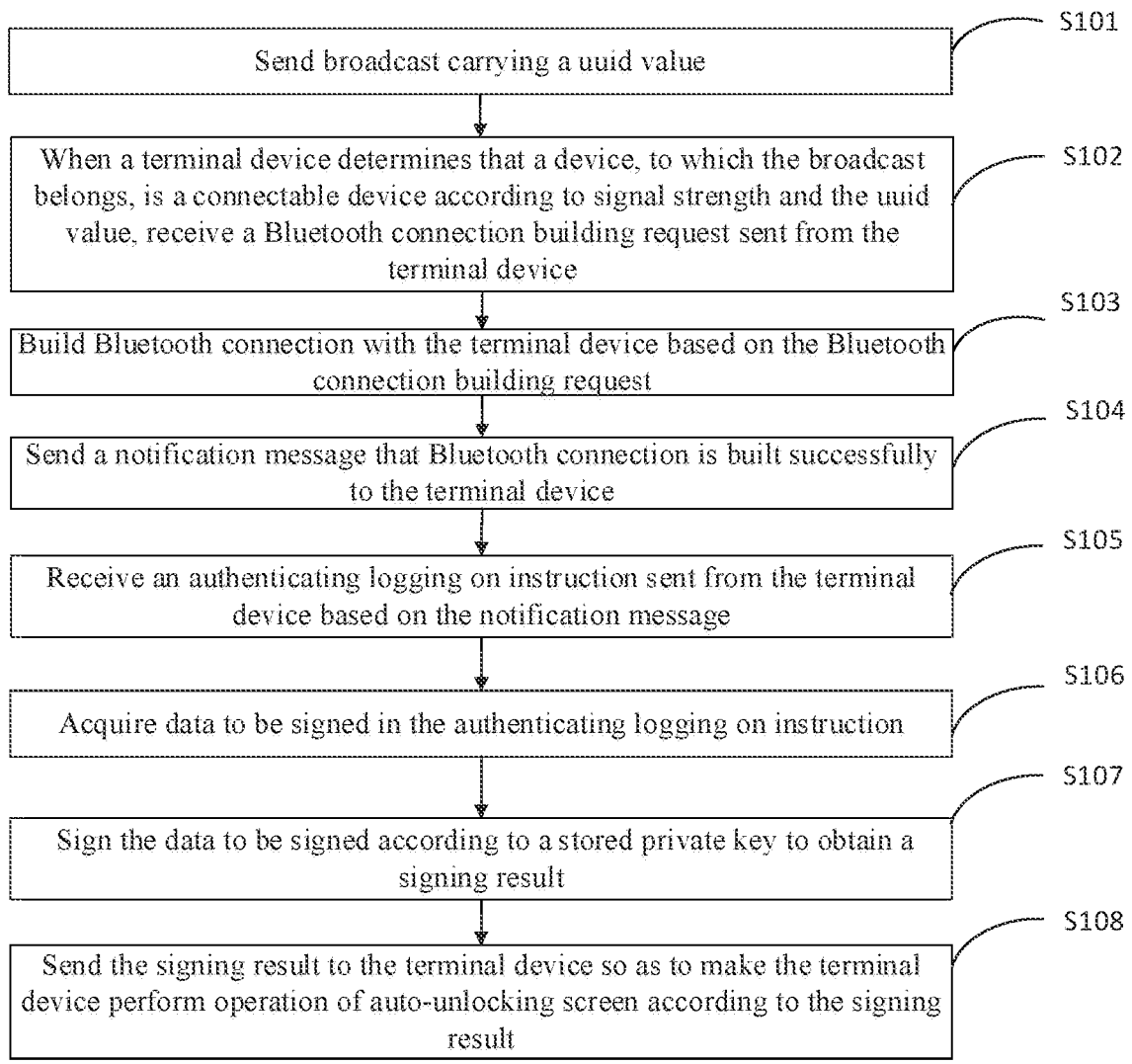
FIG. 1 is a flow chart of a method for auto-unlocking screen provided by the present invention.

The present invention provides a method for auto-unlocking screen, apparatus, electronic device and readable storage medium thereof. Accompanying with the drawings, details of embodiments of the present invention is illustrated as the following.

The embodiment of the present invention is illustrated as the following details. Examples of the embodiment are shown in the accompanying drawings; in this case, same or similar reference numbers represent same or similar elements or elements with same or similar function all the way. The Embodiment described with reference of the accompanying drawings is exemplary, is only for interpreting the present invention and cannot be explained as limitation of the present invention.

Those skilled in the art should understand, unless otherwise state, "a", "one", "the side" or "the" used as case of singularity does not exclude a case of plurality. Further, as used herein, "comprise" and/or "comprising" or both are used to describe a function, integer, step, operation, element, does not exclude the presence of one or more other functions, integers, Step S, operations, elements, components, or groups thereof, or combinations of the foregoing. When a component is described as "being connected to" or "being coupled to" another component, it should be understood that other component(s) may exist between them, although the component may be directly connected to, or coupled to, the second component. In addition, the "being connected to" or "being coupled to" including wireless connection or wireless coupling. The term "and/or" encompasses both combinations of the plurality of all related items disclosed and any item from among the plurality of related items disclosed.

Unless defined otherwise herein, all technical and scientific terms used herein have the same meaning as commonly understood by one of ordinary skill in the art to which this invention belongs. Terms defined in a general dictionary may be interpreted with the same or similar meaning as the meaning in the context of the related art and are not to be interpreted to have ideal or excessively formal meanings unless clearly defined in the present disclosure.

In order to make the purpose of this disclosure, technical solution and advantage are more clearly understood, below in conjunction with attached drawing and implementation example, the present disclosure will be further described in detail. The following specific embodiments can be combined with each other. For the same or similar definition or process may not be illustrated repeatedly in some embodiments.

Based on the technical solution provided by the present invention, technical solution is interpreted and illustrated in details as the following. In the detailed illustration and interpretation, in order to implement auto-unlocking the screen of the terminal device, it requires that a key device is in the scope of the Bluetooth connection. That is, the terminal device receives broadcast notification in the scope of specific signal strength, the key device sends broadcast continuously; when the terminal device detects the key device in a specified signal strength, it shows that the signal strength of the key device meets signal strength requirement of the terminal device, thereby the key device is confirmed to be in broadcast scope; while in order to determine whether the Bluetooth device is connectable device, it requires the terminal device to make a judgment according to the uuid value of the broadcast; only if the uuid value is a standard uuid value which can be identified by protocol stack, can the key device is determined to be a connectable key device. Therefore, after the key device is determined to be a connectable key device, the terminal device can build Bluetooth connection with the key device in such a way that the terminal device can perform transmission interaction of corresponding information of screen unlocking with the key device via the Bluetooth connection. The below embodiments provided by the present invention are described about auto-unlocking screen. In this case, the terminal device in the present invention can be a laptop computer, or a PC terminal with Bluetooth adapter, that is to say, the PC terminal can perform Bluetooth connecting and Bluetooth communicating with the key device via its Bluetooth adapter so as to implement data communication transmitting.

As shown in FIG. 1, it presents a flowchart diagram of a method for auto-unlocking screen provided by the present invention. The method includes the following steps:

Step S101, send broadcast carrying a uuid value;

Step S102, when a terminal device determines that a device, to which the broadcast belongs, is a connectable device according to signal strength and the uuid value, receive a Bluetooth connection building request sent from the terminal device;

Step S103, build Bluetooth connection with the terminal device based on the Bluetooth connection building request;

Step S104, send a notification message that Bluetooth connection is built successfully to the terminal device;

Step S105, receive an authenticating logging on instruction sent from the terminal device based on the notification message;

Step S106, acquire data to be signed in the authenticating logging on instruction;

Step S107, sign the data to be signed according to a stored private key to obtain a signing result;

Step S108, send the signing result to the terminal device so as to make the terminal device perform operation of auto-unlocking screen according to the signing result.

In the present invention, by auto-unlocking process based on Bluetooth connection, auto-unlocking a locked screen fast is implemented, which is safer.

Figure 2:
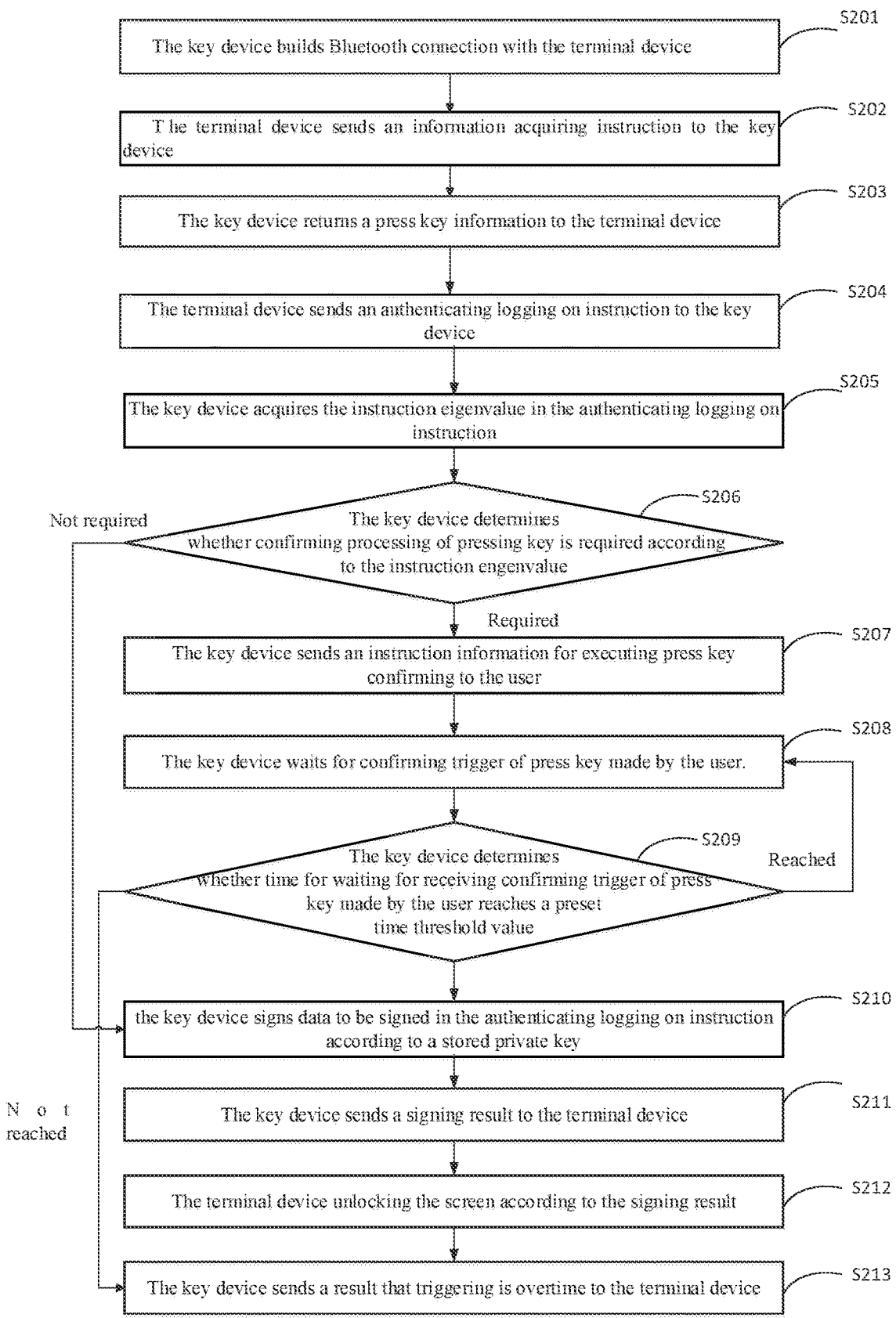
FIG. 2 is a specific processing flow chart of a possible implement of a method for auto-unlocking screen provided by the present invention.

As shown in FIG. 2, it presents a specific processing flow chart of a possible embodiment of a method for auto-unlocking screen provided by the present invention.

For the present invention, preferably, processing of Step S101 to Step S104 specifically includes processing of Step S201.

Step S201, the key device builds Bluetooth connection with the terminal device.

Preferably, when the key device carried by a user is near the terminal device, i.e. the key device is in connecting scope of the terminal device and is a connectable device, the terminal device sends a Bluetooth connecting building request to the key device actively; after the key device receives the Bluetooth connecting building request sent from the terminal device, the key device builds connection with the terminal device according to the Bluetooth connecting building request, then sends a notification message that Bluetooth connection is built successfully to the terminal device to notify the terminal that a Bluetooth connection is built between them.

Preferably, forgoing building Bluetooth connection specifically includes: the terminal device is in state of continuous receiving broadcast notification in a specified signal strength; after the terminal device detects the key device in a specified signal strength scope, it is determined that the key device is in the broadcast scope; Further, the terminal device acquires the uuid value of the broadcast, determines whether the uuid value is a standard uuid value which can be identified, if yes, the key device is determined to be a connectable key device; otherwise, the key device is determined to be a non-connectable device.

Preferably, after the terminal device builds Bluetooth connection with the key device, the method further includes the following processing:

Step S202, the terminal device sends an information acquiring instruction to the key device.

Preferably, after the key device sends a notification message that Bluetooth connection is built successfully to the terminal device, the terminal device sends an information acquiring instruction to the key device according to the notification message of the key device to acquire corresponding press key information, etc.

Step S203, the key device returns a press key information to the terminal device.

Preferably, after the key device receives the information acquiring instruction sent from the terminal device, the key device searches for corresponding press key information according to the information acquiring instruction and returns found press key information back to the terminal device.

For the present invention, preferably processing of the forgoing Step S105 to Step S108 specifically includes processing of below Step S204 to Step S213.

Step S204, the terminal device sends an authenticating logging on instruction to the key device.

Preferably, after the terminal device receives the press key information returned from the key device, the terminal device constructs a corresponding instruction eigenvalue according to the press key information, sends an authenticating logging on instruction carrying the instruction eigenvalue to the key device.

Step S205, the key device acquires the instruction eigenvalue in the authenticating logging on instruction.

Preferably, after the key device receives the authenticating logging on instruction sent from the terminal device, the key device acquires the instruction eigenvalue carried in the authenticating logging on instruction.

Step S206, the key device determines whether confirming processing of pressing key is required according to the instruction eigenvalue.

In a possible embodiment, after the key device acquires the instruction eigenvalue, the key device determines whether executing pressing key processing is required according to the instruction eigenvalue, if yes, execute Step S207; otherwise, execute Step S210.

Step S207, the key device sends an instruction information for executing press key confirming to the user.

Preferably, when the key device determines that processing of confirming by pressing key is required, the key device sends an instruction information for executing press key confirming to the user so as to instruct the user to make confirming trigger of pressing key.

Step S208, the key device waits for confirming trigger of press key made by the user.

Preferably, after the key device sends the instruction information for executing press key confirming to the user, the key device keeps on waiting for receiving processing of confirming trigger of press key made by the user.

Step S209, the key device determines whether time for waiting for receiving confirming trigger of press key made by the user reaches a preset time threshold value.

Preferably, when the key device waits for receiving confirming trigger of press key made by the user, it further requires the key device to determine whether the time for waiting for confirming trigger of press key made by the user reaches a preset time threshold value, if the time for waiting for confirming trigger of press key made by the user does not reach a preset time threshold value and confirming trigger of press key made by the user is not received, go to Step 208, keep on waiting; if the time for waiting for confirming trigger of press key made by the user reaches a preset time threshold value and confirming trigger of press key made by the user is not received, go to Step S213.

Step S210, the key device signs data to be signed in the authenticating logging on instruction according to a stored private key.

Preferably, the authenticating logging on instruction further carries the data to be signed; the key device signs the data to be signed in the authenticating logging on instruction according to the stored private key to obtain a corresponding signing result.

Step S211, the key device sends a signing result to the terminal device.

Preferably, the key device signs the data to be signed according to the private key to obtain a signing result and sends the signing result to the terminal device.

Step S212, the terminal device unlocking the screen according to the signing result.

Preferably, after the terminal device receives the signing result, the terminal device verifies the signing result according to a stored public key to obtain a verifying result, and if the verifying result is success, the terminal device executes unlocking the locked screen.

Step S213, the key device sends a result that triggering is overtime to the terminal device.

Preferably, when the key device determines that confirming trigger of pressing key made by a user is overtime, the key device sends a result that triggering is overtime to the terminal device.

Figure 3:
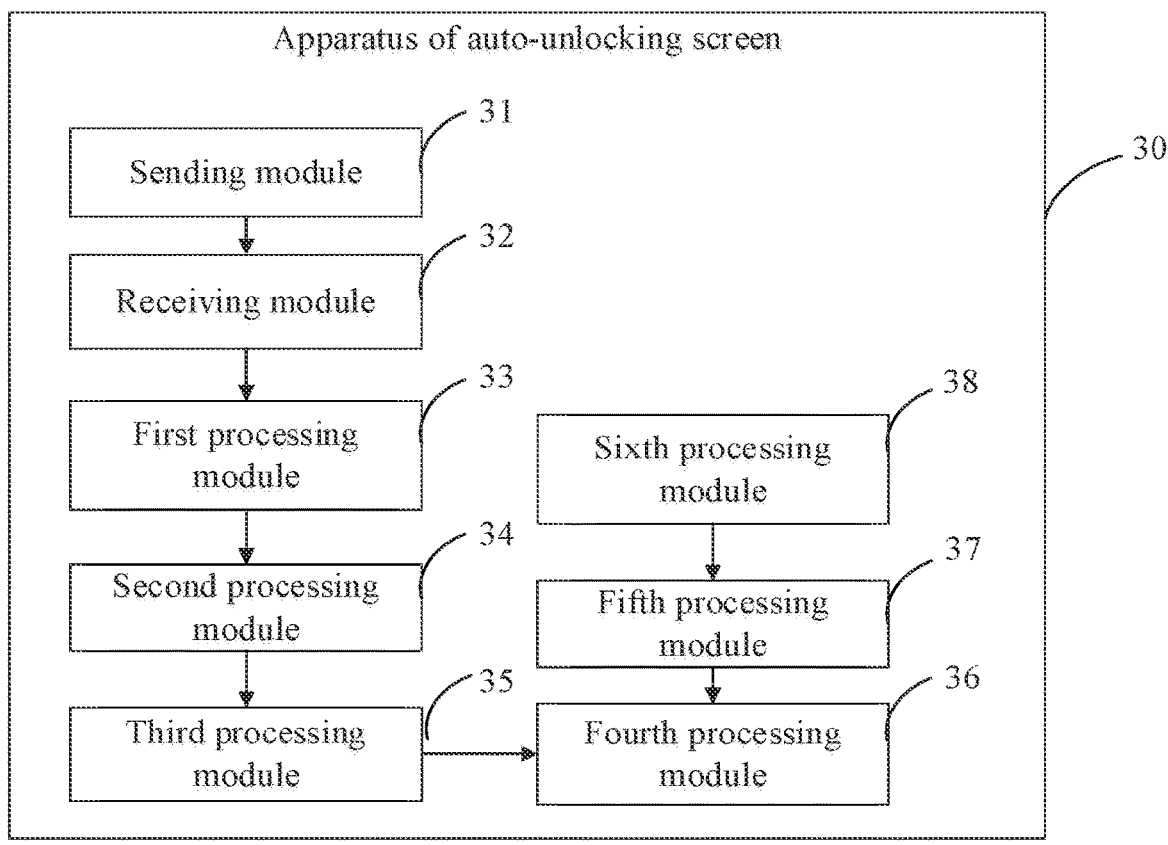
FIG. 3 is a structural diagram of an apparatus of auto-unlocking screen provided by the present invention.

Based on the technical solution of the method for auto-unlocking screen provided by the present invention, the present invention correspondingly provides a structural diagram of an apparatus of auto-unlocking screen. As shown in FIG. 3, the apparatus of auto-unlocking screen 30 can include: a sending module 31, a receiving module 32, a first processing module 33, a second processing module 34, a third processing module 35, a fourth processing module 6, a fifth processing module 37 and a sixth processing module 38;

the sending module 31 is configured to send a broadcast carried a uuid value;

the receiving module 32 is configured to, when the terminal device determines that a device, to which the broadcast belongs, is a connectable device according to signal strength and the uuid value, receive a Bluetooth connection building request sent from the terminal device;

the first processing module 33 is configured to build Bluetooth connection with the terminal device based on the Bluetooth connection building request;

the second processing module 34 is configured to send a notification message that Bluetooth connection is built successfully to the terminal device; to receive an authenticating logging on instruction sent from the terminal device based on the notification message;

the third processing module 35 is configured to acquire data to be signed in the authenticating logging on instruction;

the fourth processing module 36 is configured to sign the data to be signed according to the stored private key to obtain a singing result; and the sending module 31 is further configured to send the signing result to the terminal device so as to make the terminal device perform operation of auto-unlocking screen according to the signing result.

Preferably, the method further includes:

a fifth processing module 37 configured to acquire an instruction eigenvalue carried in the authenticating logging on instruction; determine whether requires performing process of confirming by pressing key according to the instruction eigenvalue; send an instruction information for executing press key confirming to a user and waiting for receiving confirming trigger of pressing key made by a user when processing of confirming by pressing key is determined to be required; and perform signing operation on the data to be signed according to a stored private key when processing of confirming by pressing key is determined not to be required.

Preferably, the fifth processing module 37 is configured to perform process of signing the data to be signed according to a stored private key when receiving confirming trigger of pressing key made by a user; to determine whether the time for waiting for receiving confirming trigger of pressing key made by a user reaches a preset time threshold value when not receiving confirming trigger of pressing key made by a user; to determine that trigger of pressing key made by the user is not overtime, keep on waiting for receiving confirming trigger of pressing key made by the user.

Preferably, the fifth processing module 37 is configured to, if the preset time threshold value is reached, determine that trigger of pressing key made by the user is overtime, send a result that triggering is overtime to the terminal device.

Preferably, the method further includes:

the sixth processing module 38 is configured to receive information acquiring instruction sent from the terminal device; send corresponding press key information according to the information acquiring instruction back to the terminal device.

In the present invention, by auto-unlocking processing based on Bluetooth connection, auto-unlocking the locked screen fast is implemented, which is safer; in addition, unlocking locked screen process performed between the terminal device and the key device adapts direct Bluetooth connection between the terminal device and the key device; and various ways of operating of unlocking the locked screen are adapted based on the direct Bluetooth connection, which offers a plurality of ways for unlocking the locked screen and avoids singularity of unlocking; by adapting various of unlocking ways, the security of unlocking is improved and various options are provided to a user and the usage experience of the use is improved.

Figure 4:
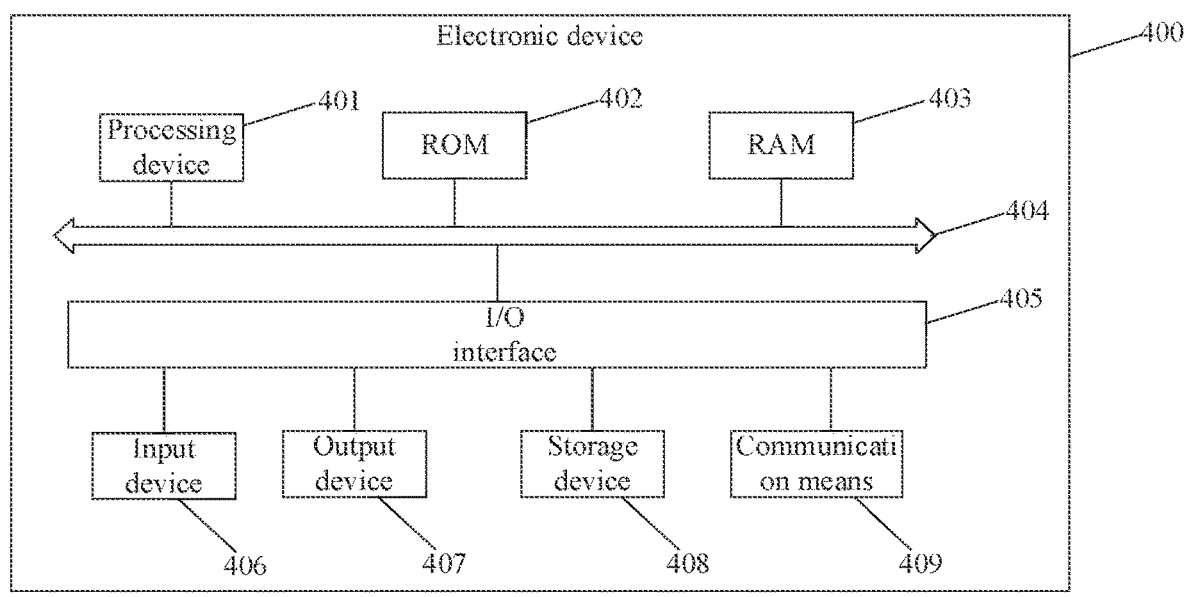
FIG. 4 is a structural diagram of an electronic device of auto-unlocking screen provided by the present invention.

As shown in FIG. 4, it shows a schematic structural diagram of an electronic device (such as a terminal device) 400 suitable for implementing an embodiment of the present disclosure. The terminal equipment in the embodiment of the present disclosure may include but not limited to such as mobile phone, notebook computer, digital broadcast receiver, personal digital assistant (Personal Digital Assistant, PDA), PAD (tablet computer), portable multimedia player (Portable Media Player), PMP), mobile terminals such as vehicle-mounted terminals (such as vehicle-mounted navigation terminals), and fixed terminals such as digital televisions (Television, TV), desktop computers, and the like. The electronic device shown in FIG. 4 is only an example, and should not limit the functions and scope of use of the embodiments of the present disclosure.

As shown in FIG. 4, an electronic device 400 may include a processing device (such as a central processing unit, a graphics processing unit, etc.) 401, which can execute various appropriate actions and processes according to program stored in ROM 402 or program loaded into the random access memory (RAM) 503 from the storage device 408. In the RAM 403, various programs and data necessary for the operation of the electronic device 400 are also stored. The processing device 401, ROM 502, and RAM 403 are connected to each other through a bus 404. An input/output (Input/Output, I/O) interface 405 is also connected to the bus 404.

Generally, the following devices can be connected to the I/O interface 405: an input device 406 including, for example, a touch screen, a touchpad, a keyboard, a mouse, a camera, a microphone, an accelerometer, a gyroscope, etc.; an output device 407 including, for example, a liquid crystal display (LCD), a speaker, a vibrator, etc.; a storage device 408 including, for example, a magnetic tape, a hard disk, etc.; and a communication device 409. The communication means 409 may allow the electronic device 400 to perform wireless or wired communication with other devices to exchange data. While FIG. 4 shows the electronic device 400 having various devices, it is to be understood that implementing or having all of the devices shown is not a requirement. More or fewer devices may alternatively be implemented or provided.

In particular, according to embodiments of the present disclosure, the processes described above with reference to the flowcharts can be implemented as computer software programs. For example, embodiments of the present disclosure include a computer program product, which includes a computer program carried on a computer readable medium, where the computer program includes program code for executing the method shown in the flowchart. In such embodiments, the computer program may be downloaded and installed from a network via communication device 409, or installed from storage device 408, or installed from ROM 402. When the computer program is executed by the processing device 401, the above-mentioned functions defined in the methods of the embodiments of the present disclosure are executed.

It should be noted that the above-mentioned computer-readable medium in the present disclosure may be a computer-readable signal medium or a computer-readable storage medium or any combination of the above two. A computer readable storage medium may be, for example, but not limited to, an electrical, magnetic, optical, electromagnetic, infrared, or semiconductor system, apparatus, or device, or any combination thereof. More specific examples of computer-readable storage media may include, but are not limited to, electrical connections having at least one lead, portable computer diskettes, hard disks, random access memory (RAM), read-only memory (ROM), erasable programmable Read memory ((Erasable Programmable Read-Only Memory, EPROM) or flash memory), optical fiber, portable compact disk read-only memory (Compact Disc Read-Only Memory, CD-ROM), optical storage device, magnetic storage device, or any of the above the right combination. In the present disclosure, a computer-readable storage medium may be any tangible medium that contains or stores a program that can be used by or in conjunction with an instruction execution system, apparatus, or device. In the present disclosure, however, a computer-readable signal medium may include a data signal propagated in baseband or as part of a carrier wave carrying computer-readable program code therein. Such propagated data signals may take many forms, including but not limited to electromagnetic signals, optical signals, or any suitable combination of the foregoing. A computer-readable signal medium may also be any computer-readable medium other than a computer-readable storage medium, which can transmit, propagate, or transmit a program for use by or in conjunction with an instruction execution system, apparatus, or device. The program code contained on the computer readable medium can be transmitted by any appropriate medium, including but not limited to: electric wire, optical cable, radio frequency (Radio Frequency, RF), etc., or any suitable combination of the above.

The computer-readable medium may be included in the electronic device described in the foregoing embodiments, or may exist alone and is not disposed in the electronic device.

The computer-readable medium carries one or more programs; the one or more programs, when executed by the electronic device, causes the electronic device to acquire at least two internet protocol addresses, sends a node evaluating requests including at least two internet protocol addresses to a node evaluating device; in this case, the node evaluating device selects a internet protocol address from the at least two internet protocol addresses and returns the internet protocol address; receives the internet protocol address returned from the node evaluating device; in this case, the acquired internet address indicates edge nodes in a content allocating network.

Or the computer readable medium carries one or more programs, the one or more programs, when executed by the electronic device, causes the electronic device to receive an evaluating requests including at least two internet protocol addresses; selects an internet protocol address from the at least two internet protocol addresses and returns the selected internet protocol address; in this case, the acquired internet address indicates edge nodes in a content allocating network.

Computer program code for performing operations of aspects of the present invention includes object-oriented programming languages such as Java®, Smalltalk®, C++, and conventional procedural programming languages, for example, "C" programming language or similar programming languages. This program code can be run entirely on the user's computer as a stand-alone software package or partially on the user's computer, partly on the user's computer and partly on the remote computer Or it can run exclusively on a remote computer or server. In the latter case, the remote computer can also be connected to the user's computer via any type of network, including a local area network (LAN) or a wide area network (WAN). Alternatively, a connection can be made to an external computer (e.g. via the Internet using an Internet service provider).

The flowcharts and block diagrams in the Figures illustrate the architecture, functionality, and operation of possible implementations of systems, methods and computer program products according to various embodiments of the present invention. In this regard, each block in the flowchart or block diagram may represent a module, segment, or portion of code that includes one or more executable instructions for implementing the specified logical function (s). It should also be noted that in some other implementations, the functions described in the blocks may be performed out of the order described in the drawings. For example, two blocks shown in succession may actually be executed almost simultaneously, depending on the functions involved, and sometimes these blocks may be executed in reverse order. Further, each block in the block diagram and/or flowchart diagram, and combinations of blocks in the block diagram and/or flowchart diagram, are specific application hardware-based systems that perform specific functions or operations, or It should also be noted that it can be implemented by a combination of special purpose hardware and computer instructions.

A related unit described in the embodiments of this application may be implemented in a software manner, or may be implemented in a hardware manner. In this case names of the units do not constitute a limitation on the units in a specific case, for example, the first acquiring unit may be described as a unit for acquiring at least two internet protocol address.

This embodiment best describes the principles and practical applications of the present invention, and those persons skilled in the art will understand the scope related to present invention is not limited to the technical solution formed by specific combination of the above technical features, meanwhile the scope covers other technical solution formed by any combination of the above features or equivalent features without departing the above public idea, for example, a technical solution formed by making equivalent replacement of the above feature and technical feature with similar functions which is disclosed, but not limit to the disclosed.

The electronic device provided by the present invention is suitable for any embodiment of the method for auto-unlocking screen above, no more detail is given here.

In the present invention, by auto-unlocking processing based on Bluetooth connection, auto-unlocking the locked screen fast is implemented, which is safer, in addition, unlocking locked screen process performed between the terminal device and the key device adapts direct Bluetooth connection between the terminal device and the key device; and various ways of operating of unlocking the locked screen are adapted based on the direct Bluetooth connection, which offers a plurality of ways for unlocking the locked screen and avoids singularity of unlocking; by adapting various of unlocking ways, the security of unlocking is improved and various options are provided to a user and the usage experience of the use is improved.

The present invention provides a computer readable storage medium, the computer readable storage medium stores computer programs which make a computer to execute the method for auto-unlocking locked screen presented by the embodiment above.

The computer readable storage medium provided by the present invention is suitable for any embodiment of the above method for auto-unlocking locked screen. No more detail is repeated here.

In the present invention, by auto-unlocking processing based on Bluetooth connection, auto-unlocking the locked screen fast is implemented, which is safer; in addition, unlocking locked screen process performed between the terminal device and the key device adapts direct Bluetooth connection between the terminal device and the key device; and various ways of operating of unlocking the locked screen are adapted based on the direct Bluetooth connection, which offers a plurality of ways for unlocking the locked screen and avoids singularity of unlocking; by adapting various of unlocking ways, the security of unlocking is improved and various options are provided to a user and the usage experience of the use is improved.

Those skilled in the art should understand that computer program instructions can be used to implement each block of those structural diagrams and/or block diagrams and/or flowcharts or combination of the blocks of those structural diagrams and/or block diagrams and/or flowcharts. Those skilled in the art should understand that those computer program instructions can be provided to a general purpose computer, a professional computer or a processor of another programmable data processing method in such way that the solution specified in a block or a plurality of blocks of structural diagram and/or block diagram and/or flow chart disclosed by the present invention is executed via the computer or the processor of the method of another programmable data processing.

In this case, the blocks of the apparatus of the present invention can be integrated as a whole or deployed separately. Those modules forgoing can be integrated as one module or divided into many sub-modules.

Those skilled in art should understand that accompany drawings are diagrams of a prefer embodiment, a module or a process in the accompany drawings may not be necessary for implanting the present invention.

Those skilled in art should understand that the modules in the apparatus of the embodiments can be positioned as illustration of the embodiments, or corresponding changes might be made for the position of the modules in one or more apparatuses of the present embodiments. The blocks of the forgoing embodiments can be combined into one module or divided into many sub-modules.

The sequence number for the abovementioned implementation cases is only applied for the purpose of description, which does not represent the pros and cons of the individual implementation cases.

The above disclosed is only a few particular embodiments of the invention. However, the invention is not limited to this, and any change capable of being thought by one with skill in the art shall fall into the protection scope of the invention.

The invention claimed is:

1. A method for auto-unlocking a screen, comprising the following steps:
   sending a broadcast carrying a uuid (universally unique identifier) value;
   receiving a Bluetooth connection building request sent from a terminal device when the terminal device determines a device to which the broadcast belongs is a connectable device according to signal strength and the uuid value of the broadcast;
   building a Bluetooth connection with the terminal device based on the Bluetooth connection building request;
   sending a notification message that the Bluetooth connection is built successfully to the terminal device;
   receiving an authenticating logging-on instruction sent from the terminal device based on the notification message;
   acquiring data to be signed and being carried in the authenticating logging-on instruction;
   signing the data to be signed according to a stored private key to obtain a signing result; and
   sending the signing result to the terminal device, so as to make the terminal device perform operation of auto-unlocking screen according to the signing result; wherein after receiving the authenticating logging-on instruction sent from the terminal device based on the notification message, the method further comprises:

acquiring an instruction eigenvalue carried in the authenticating logging-on instruction;

determining whether a process of confirming by pressing a key is required to perform according to the instruction eigenvalue;

sending an instruction information for executing the confirming by pressing the key to a user and waiting for receiving a trigger to perform confirming of pressing the key made by the user when processing of confirming by pressing the key is determined to be required; and performing the signing operation on the data to be signed according to the stored private key when processing of confirming by pressing the key is determined not to be required.

2. The method of claim 1, wherein waiting for receiving the trigger to perform confirming of pressing the key made by the user comprises:

when receiving the trigger to perform confirming of pressing the key made by the user, performing the process of signing the data to be signed according to the stored private key;

when not receiving the trigger to perform confirming of pressing the key made by the user, determining whether times for waiting for receiving the trigger to perform confirming of pressing the key made by the user reaches a preset time threshold value; and if the preset time threshold value is not reached, determining that the trigger of pressing the key made by the user is not overtime, and keeping waiting for receiving the trigger to perform confirming of pressing the key made by the user.

3. The method of claim 2, wherein the method further comprises:

if the preset time threshold value is reached, determining that the trigger of pressing key the made by the user is overtime, then sending a result that triggering is overtime to the terminal device.

4. The method of claim 1, wherein the method further comprises:

receiving an information acquiring instruction sent from the terminal device; and sending a corresponding pressing key information according to the information acquiring instruction back to the terminal device.

* * * * *